(12) United States Patent
Myrah et al.

(10) Patent No.: US 9,009,311 B2
(45) Date of Patent: Apr. 14, 2015

(54) INITIATOR ZONING IN PROGRESS COMMAND

(75) Inventors: Michael G Myrah, Cypress, TX (US);
Balaji Natrajan, Spring, TX (US);
Joseph David Black, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 314 days.

(21) Appl. No.: 13/556,994

(22) Filed: Jul. 24, 2012

(65) Prior Publication Data

US 2014/0032754 A1  Jan. 30, 2014

(51) Int. Cl.
*H04L 29/08* (2006.01)
*H04L 29/06* (2006.01)
*G06F 3/06* (2006.01)

(52) U.S. Cl.
CPC ........... *H04L 67/1097* (2013.01); *G06F 3/067* (2013.01); *H04L 63/104* (2013.01)

(58) Field of Classification Search
CPC ......................... G06F 15/173; H04L 65/1097
USPC .......................................... 709/223, 225, 226
See application file for complete search history.

(56) References Cited

U.S. PATENT DOCUMENTS

| | | | |
|---|---|---|---|
| 5,954,796 A * | 9/1999 | McCarty et al. | 709/222 |
| 7,437,462 B2 * | 10/2008 | Marks et al. | 709/226 |
| 7,890,617 B2 | 2/2011 | Odenwald, Jr. et al. | |
| 7,958,282 B2 | 6/2011 | Odenwald, Jr. et al. | |
| 7,996,509 B2 * | 8/2011 | Basham et al. | 709/223 |
| 8,898,342 B2 * | 11/2014 | Joshi et al. | 710/5 |
| 2003/0065782 A1 * | 4/2003 | Nishanov et al. | 709/226 |
| 2003/0085914 A1 * | 5/2003 | Takaoka et al. | 345/734 |
| 2004/0078599 A1 * | 4/2004 | Nahum | 713/201 |
| 2005/0091353 A1 | 4/2005 | Gopisetty et al. | |
| 2008/0120687 A1 * | 5/2008 | Johnson | 726/1 |
| 2008/0244620 A1 * | 10/2008 | Cagno et al. | 719/326 |
| 2009/0083423 A1 * | 3/2009 | Basham et al. | 709/226 |
| 2009/0083484 A1 | 3/2009 | Basham et al. | |
| 2009/0298505 A1 * | 12/2009 | Drane et al. | 455/446 |
| 2010/0115073 A1 * | 5/2010 | Odenwald et al. | 709/223 |
| 2011/0208924 A1 * | 8/2011 | Kakui et al. | 711/154 |
| 2012/0117610 A1 * | 5/2012 | Pandya | 726/1 |
| 2012/0271996 A1 * | 10/2012 | Jenkins et al. | 711/114 |
| 2012/0278552 A1 * | 11/2012 | Singh et al. | 711/114 |
| 2013/0272313 A1 * | 10/2013 | Hathorn et al. | 370/419 |
| 2013/0283264 A1 * | 10/2013 | Bhattacharya et al. | 718/1 |
| 2013/0304951 A1 * | 11/2013 | Goel et al. | 710/65 |

OTHER PUBLICATIONS

Merriam Webster, "zone", 2015.*
Merriam Webster, "arbitration", 2015.*
Bakke et al., "iSCSI Naming and Discovery", 2001.*
Elliott, "SAS-2 Open_Reject Retry during self-configuration changes", 2006.*
Tate et al., "IBM SAN Survival Guide Featuring the CNT Portfolio", 2003.*
Elliot, "Information Technology—Serial Attached SCSI—2 (SAS-2)", 2008.*
Satran, "iSCSI—fragments, packets, synchronization and RDMA", 2000.*

* cited by examiner

*Primary Examiner* — O. C. Vostal
(74) *Attorney, Agent, or Firm* — Hewlett-Packard Patent Department

(57) ABSTRACT

An initiator zoning in progress command is provided. In one aspect the zoning in progress command includes target devices. Upon completion of the zoning operation, a zoning complete command is provided. In another aspect, receipt of a zoning in progress command causes broadcast change commands to be ignored until the zoning complete command is received.

20 Claims, 8 Drawing Sheets

INITIATOR ZONING IN PROGRESS COMMAND

BACKGROUND

In modern computing systems, servers and storage devices, such as disks, optical drives, and tape drives, may be located remotely from each other. The servers may be connected to the storage devices through a network fabric which allows data to be transferred between the servers and the storage devices. One such fabric is a Serial Attached Small Computer Systems Interface (SAS) fabric. In order to limit which servers may communicate with which storage devices, the SAS provides the ability to place the servers and storage devices into zones. Only servers and storage devices that are in the same zone are allowed to communicate.

Zoning is accomplished though zone permissions tables. A SAS fabric may contain expanders, which have a plurality of ports, referred to as PHYs. The servers and storage devices connect to the PHYs. The expander is able to route data between the PHYs. The zone permissions tables determine which PHYs, and thus which servers and storage devices, are allowed to communicate with each other. It may become necessary at times to reconfigure which servers are allowed to communicate with which storage devices. For example, a new storage device or server may be added and connectivity provided to that device must be configured. As another example, a storage device or server that was in a first zone may need to be reconfigured to belong to a different zone.

In order to perform this rezoning operation, a SAS zone manager may be used. In a typical rezoning operation, the SAS Zone manager may configure a shadow copy of the zone permissions tables to reflect the newly configured zones. The shadow copy of the zone permissions table is not made active while the SAS zone manager is configuring the table. Once the configuration is complete, the SAS zone manager may deactivate the zone permissions table and substitute the shadow copy, thus causing the new zone permissions to take effect. Once the activation occurs, each server may initiate a fabric discovery process to determine the new topology of the SAS fabric. During this process, the servers may determine to which storage devices access has been granted.

DETAILED DESCRIPTION

Figure 1:
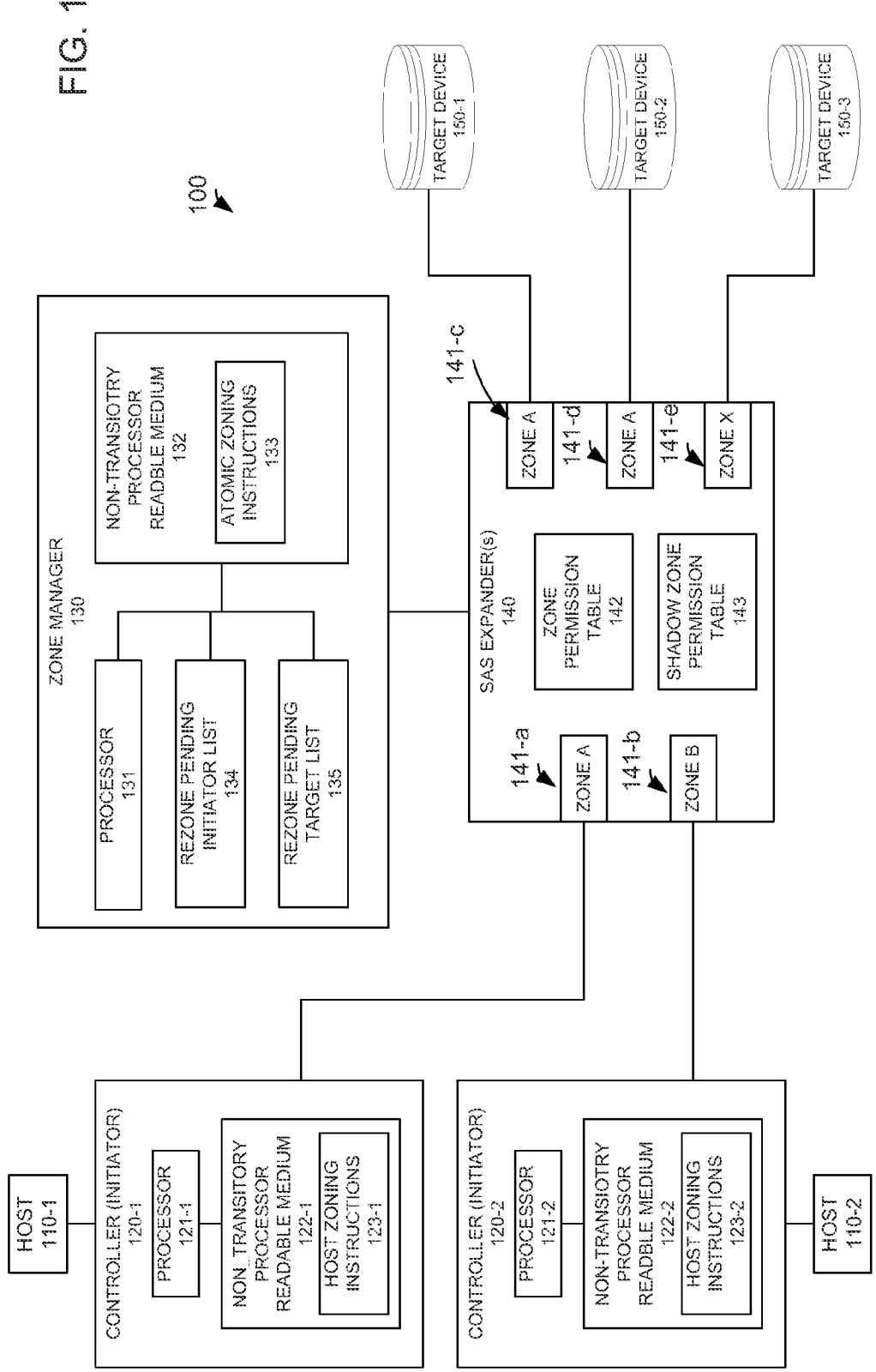
FIG. 1 is an example of a system in which techniques disclosed herein may be implemented.

As explained above, in a normal rezoning operation, the SAS zone manager may modify a shadow copy of the zone permissions table to reflect the new zone permissions. The zone permissions are what determines which servers, through an associated controller, also referred to as an initiator, may access which storage devices, which are also referred to as target devices. Once all of the needed changes to the shadow zone permissions table are made, the zone manager may send an activate command to the expander. At this point, the shadow zone permissions table becomes active, and the permissions granted therein are then applied to the SAS fabric. In addition, the zone manager may send a BROADCAST CHANGE notification, which will prompt all of the initiators to conduct a discovery process. During the discovery process, each initiator determines the topology of the SAS fabric and determines which targets may be accessed.

In an SAS fabric, there may be multiple expanders. The zone manager typically activates each expander in sequence. Once all of the expanders have been activated, the zone manager sends a BROADCAST CHANGE message to prompt the initiation of the discovery process by the initiators. However, a problem may arise if a BROADCAST CHANGE message is sent prior to all of the expanders being activated. For example, a rogue target device may be having trouble connecting to the fabric and is sending out periodic BROADCAST CHANGE messages. When such a rogue BROADCAST CHANGE message is received by an initiator, the discovery process may be started, even if the zone manager has not yet finished activating all of the expanders. The resulting discovery process may result in the initiators having an incorrect view of the fabric topology.

For example, a system may have two expanders. The zone manager may be moving target devices from one zone to another zone. Assume that there are a total of 3 target devices that are being moved from a first zone to a second zone, and that 2 of the targets are connected to the first expander, while the remaining target device is connected to the second expander. The zone manager may have activated the first expander, thus causing two of the target devices to move to the new zone. However, if a rogue BROADCAST CHANGE message is received prior to the second expander being made active, the initiators may perform the discovery process and determine that the third target is unavailable, and mark it as such. Once the second expander is made active and the zone manager sends out a BROADCAST CHANGE message, the third target has already been marked as unavailable. Thus, the third target remains in an unusable state.

The techniques provided herein prevent the situation in which a rogue BROADCAST CHANGE message may cause an improper discovery of the SAS fabric topology. This result is achieved by performing rezoning operations in an atomic manner, such that the discovery process is inhibited until all zoning changes have been made and the affected expanders have been made active. In other words, the zoning operation is made atomic, in that the operation is not considered complete until all of the zoning changes are in place. Only upon completion of the zoning operation will the initiators attempt to discover the new SAS fabric topology.

FIG. 1 is an example of a system in which techniques disclosed herein may be implemented. The system 100 may include hosts 110-1,2, controllers 120-1,2, zone manager 130, SAS expander 140, and target devices 150-1,2,3. Although only a limited number of hosts, controllers, SAS expander devices, and target devices are shown, it should be understood that there be any number of these devices, and the limited number are shown for purposes of ease of description. There will typically only be a single zone manger, however the techniques described herein are not limited to SAS fabric topologies containing a single zone manager. In the interconnection of all of the devices described above forms the SAS fabric topology.

Hosts 110-1,2 may be any type of computing device that accesses storage devices. For example, the hosts may be server computers, desktop computers, mobile computers, etc. Coupled to each host may be a controller 120-1,2, which may also be referred to as an initiator. The specific from of the controller is not important, but rather it should be understood that the controller is the device that communicates with the SAS fabric. Some examples of controllers include single drive controllers, RAID controllers, array controllers, and the like. For purposes of the remainder of this description, the specific type of controller is unimportant and the controller will be referred to as an initiator.

The initiators 120-1,2 may contain a processor 121-1,2 which is able to execute processor instructions. Coupled to the processors may be a non-transitory processor readable medium 122-1,2 which contains thereon instructions that are readable and executable by the processor. For example, the medium 122-1,2 may contain host zoning instructions 123-1,2 which when executed by the processor cause the processor to provide the functionality described herein. The functionality of the host zoning instructions is described in further detail below.

Zone manager 130 may be responsible for configuring the zoning of the SAS fabric. As explained above, SAS zoning allows the SAS fabric to be divided by specifying which initiators are allowed to communicate with which target devices. The zone manager may present a user interface to an administrator through which the administrator may specify which initiators and targets may communicate. The zone manager may include a processor 131 which is able to execute processor instructions. Coupled to the processor may be a non-transitory processor readable medium 132 which contains thereon instructions that are readable and executable by the processor. For example, the medium 132 may contain manager zoning instructions 133, which when executed by the processor cause the processor to provide the functionality described herein. The functionality of the manager zoning instructions is described in further detail below.

The zone manager 130 may also include a rezone pending initiator list 134. The rezone pending initiator list may be used to store the identifications of initiators that are currently involved in a rezoning process. For example, if the user is rezoning target devices from one initiator to another initiator, the two initiators involved in the transfer would be included in the rezone pending initiator list to indicate that some type of rezoning is in progress for those initiators. Likewise, the zone manager may include a rezone pending target list 135. The rezone pending target list may include all target devices that are currently involved in a rezoning process. Use of the lists 134, 135 is described in further detail below.

SAS expander 140 may server to connect the various initiators and targets. The SAS expander may have a number of ports, also referred to as PHYs 141-*a-e*. Each PHY may connect to an initiator or a target. The expander may provide connectivity between each of the ports in a manner very similar to a network switch or router. That is to say that data that arrives at one PHY may be sent out on a different PHY. The SAS expander may also include zone permission table 142. As mentioned above, the SAS fabric may be portioned such that only initiators and targets that are in the same zone are allowed to communicate with each other. The zone permission table may be used to store the association of each PHY with a zone. Data that arrives on one PHY will only be able to be transmitted on another PHY when both the incoming and outgoing PHYs are in the same zone.

The SAS expander may also include a shadow zone permission table 143. The shadow zone permission table is similar to the zone permission table, with the exception that the shadow zone permission table is not yet active. In other words, the permissions contained in the shadow zone permission table are not used to determine which PHYs are allowed to communicate. The shadow zone permission table may be activated, and once activated may take the place of the zone permission table 142. Although only one SAS expander 140 is shown, it should be understood that there may be any number of SAS expanders.

Target devices 150-1-3 may be any type of storage device. For example, the target devices may be disk drives, optical drives, tape drives, solid state drives, or any other type of storage device. What should be understood is that the target devices, regardless of form, provide storage for the hosts, through the initiators. Just as with the initiators, the target devices may be connect to the SAS expander through one of the PHYs. As each PHY is associated with a zone, the target devices may only communicate with initiators that are in the same zone.

In operation, an administrator may wish to rezone target devices from one initiator to another. As shown in FIG. 1, initiator 120-1 is currently assigned to zone A. Initiator 120-2 is currently assigned to zone B. Likewise, target devices 150-1,2 are assigned to zone A. As such, only initiator 120-1 may communicate with target devices 150-1,2. Target device 150-3 may be associated with some other zone, referred to as zone X. For purposes of simplicity of description, target device 150-3 is shown as being connected to the same SAS expander as target devices 150-1,2. However, it should be understood that target device 150-3 may be connected to any expander.

The administrator may wish to rezone target devices 150-1,2 from zone A to zone B. As such, the administrator will access a user interface on the zone manger 130 and input the desired changes. The zone manager may then include initiators 120-1,2 in the rezone pending initiator list 134. Likewise, the zone manager may include target devices 150-1,2 in the rezone pending target list 135. The zone manager may then update the shadow zone permission table on the SAS expander 140 to reflect the new configuration. Prior to activating the shadow zone permission table, the zone manager may send a zoning in progress command to the initiators contained in the rezone pending initiator list. The zoning in progress command may contain the list of targets contained in the rezone pending target list. Receipt of the zoning in progress message may cause the initiators to exhibit behavior that will be described in further detail below.

The zone manager may then send an activate command to the SAS expander to make the shadow zone permissions table active. Thus, the new configuration contained in the shadow zone permissions table may then take the place of the zone permissions table. The zone manager may then send a zoning complete message to the initiators in the rezone pending initiator list. The behavior of the initiators after receiving the zoning complete message is described in further detail below.

Figure 2:
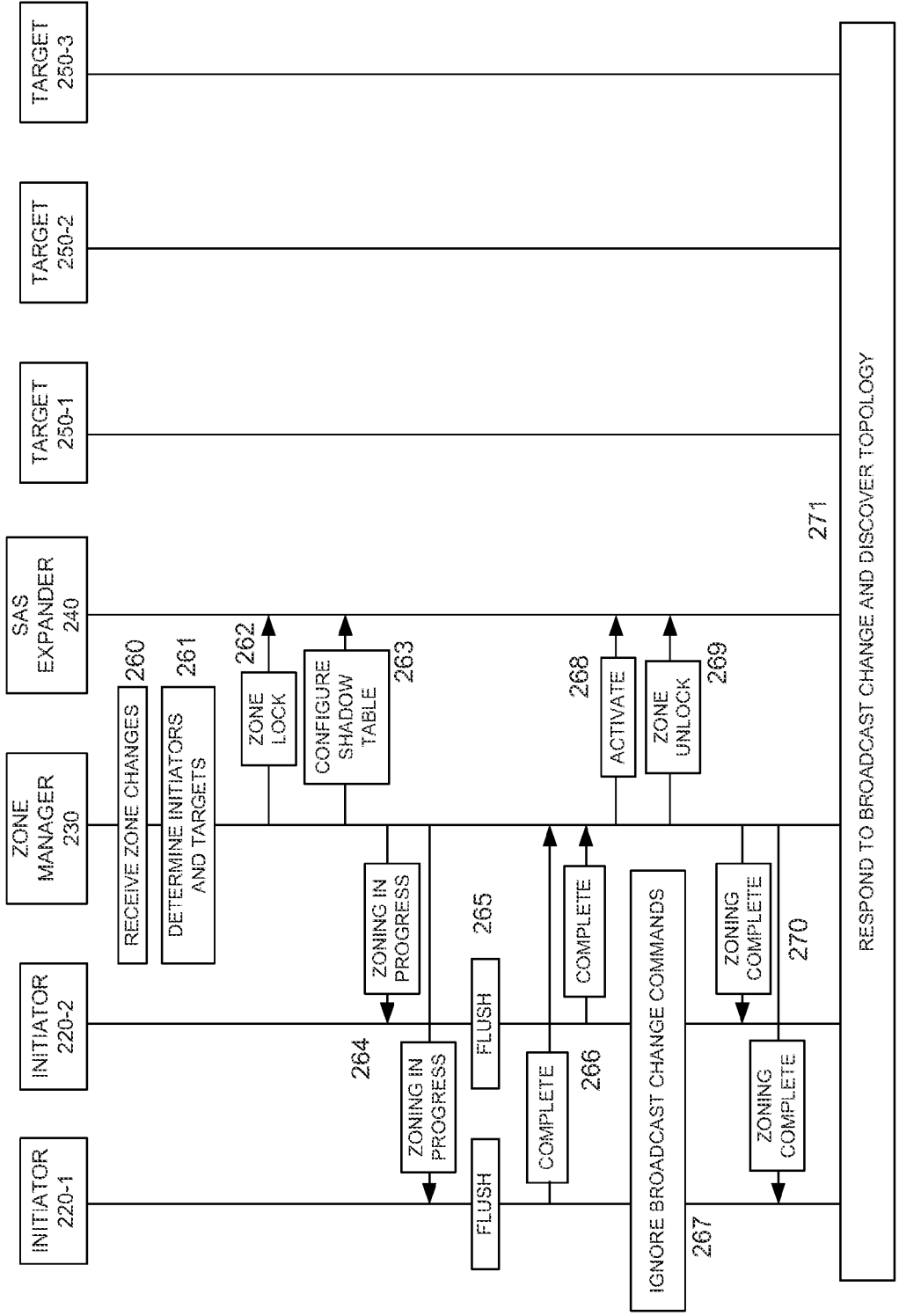
FIG. 2 is an example of a message sequence for rezoning.

FIG. 2 is an example of a message sequence for rezoning. For purposes of this description, assume that a rezoning process as described with respect to FIG. 1 is being conducted. In other words, assume that there are two target devices, such as devices 250-1,2 that are being rezoned from initiator 220-1 to initiator 220-2. It should be understood that this example is presented for ease of description only and is not limiting.

The zone manager 230 may receive zoning changes 260. As explained above, the zoning changes may be received from an administrator. The zone manager may then proceed to determine the initiators and targets 261 that are affected by the zoning changes. In this example, the affected initiators are initiators 220-1,2 and the affected targets are targets 250-1,2. The affected initiators and targets may be placed in the rezone pending initiator and target list respectively.

The zone manager may send a standard zone lock 262 command to the SAS expander 240. The zone lock command informs the expander that a zoning operation is about to occur. The zone manager may then configure the shadow zone permission table 263 on the expander. As was explained above, changes to the shadow zone permission table do not take effect until the SAS expander receives a command to activate the shadow zone permission table.

The zone manager may then send a new command called the zoning in progress 264 command to each initiator in the list of rezone pending initiators. According to the present example, the rezone pending command will be sent to initiators 220-1,2. Included in the zoning in progress command may be the targets contained in the rezone pending target list. The initiator is thus made aware of the targets that are going to be affected by the rezoning operation that is in progress.

The initiators then respond to the zoning in progress command by exhibiting several new behaviors. One of these behaviors is that each initiator will flush 265 all data intended for the targets contained in the rezone pending target list. As explained above, the initiators are what allows a host to read and write data to/from a target. In many implementations, an initiator will maintain a buffer to store data from the host prior to sending that data to the target. Upon receipt of the zoning in progress command, the initiator may flush any stored data intended for the target to the target. The reason for this is that once the target has been rezoned, it may no longer be possible for the initiator to access the target. By flushing the buffer, the initiator is able to ensure that the data the host has queued and received completion for prior to the zoning change has been stored on the target has actually been stored on the target.

Another behavior that may be exhibited by the initiator as part of the flush process is to stop sending new data from the host to the target. In some example implementations, the initiator may reject new data from the host indicating a rezoning is in progress. In other example implementations, the initiator may buffer data received from the host until the zoning operation is complete. If the target is accessible after the rezoning, the data may be sent to the target. If the target is not available due to the rezoning, the initiator may inform the host that the operation failed, as the target is no longer accessible. If the initiator were to continue accepting new data from the host and sending it to the target during the rezoning, there is no way for the initiator to guarantee that the data will eventually be received by the target. This is because after the rezoning, the target may no longer be accessible by the initiator. By no longer sending new data from the host to the target until the rezoning process is complete, the initiator can ensure that all data intended for a target is actually delivered to that target.

Once the data has been flushed, the initiators may send a complete 266 command to the zone manager. The complete command informs the zone manager that the initiator has flushed all transient data to the target. One final behavior exhibited by the initiators is that the initiators will begin ignoring BROADCAST CHANGE commands 267. Although depicted as occurring after the complete message is sent, this is not to imply a sense of ordering. In some implementations, the initiators will begin ignoring new BROADCAST CHANGE commands as soon as a zoning in progress command is received. By ignoring BROADCAST CHANGE commands, it can be ensured that the initiators do not attempt to initiate the discovery process before the zoning operations have completed. Thus, even if a rogue target device, or any other device on the SAS fabric, were to send a BROADCAST CHANGE command, the initiators would ignore it and would not begin a discovery process.

Once the zone manager has received the complete messages from the initiators, the zone manager may send an activate 268 command to the SAS expander. As explained above, the activate command informs the expander that the shadow zone permissions table, which contains the new zoning information provided by the administrator, should now be made active. After activating the shadow zone permission table, the zone manager may send a zone unlock 269 command to the expander. This may inform the expander that the zoning operations for this particular expander have completed. However, the zone unlock command does not mean that zoning operations have completed for all expanders. As mentioned above, the system may include multiple zone expanders. Thus, until all expanders have received the zone unlock command, the overall zoning operation is not complete.

Once the zone manager has sent the zone unlock commands to all expanders, the rezoning process may be complete for the entire fabric. The zone manger may then send a zoning complete 270 command to all initiators in the rezone pending initiators list. Upon receipt of the zoning complete message, the initiators will again begin responding to BROADCAST CHANGE commands. As a final step, the zone manager may send a BROADCAST CHANGE command 271 which may be received by all initiators and targets. The discovery process may be started by all the initiators and through this process the targets that have now been zoned to each initiator can be discovered. In addition, the initiators may again start receiving data from their associated hosts.

In some cases, it is possible that an initiator comes online after the zoning in progress command is sent. For example, an initiator may have just gone through boot process. Thus the initiator is not aware that a zoning operation is in progress and may attempt to discover the topology of the SAS fabric, even though the topology is in the process of being changed. To prevent this situation from occurring, the SAS expander will not allow the PHY connected to the newly booted initiator to come online until the zoning operation is complete.

Figure 3:
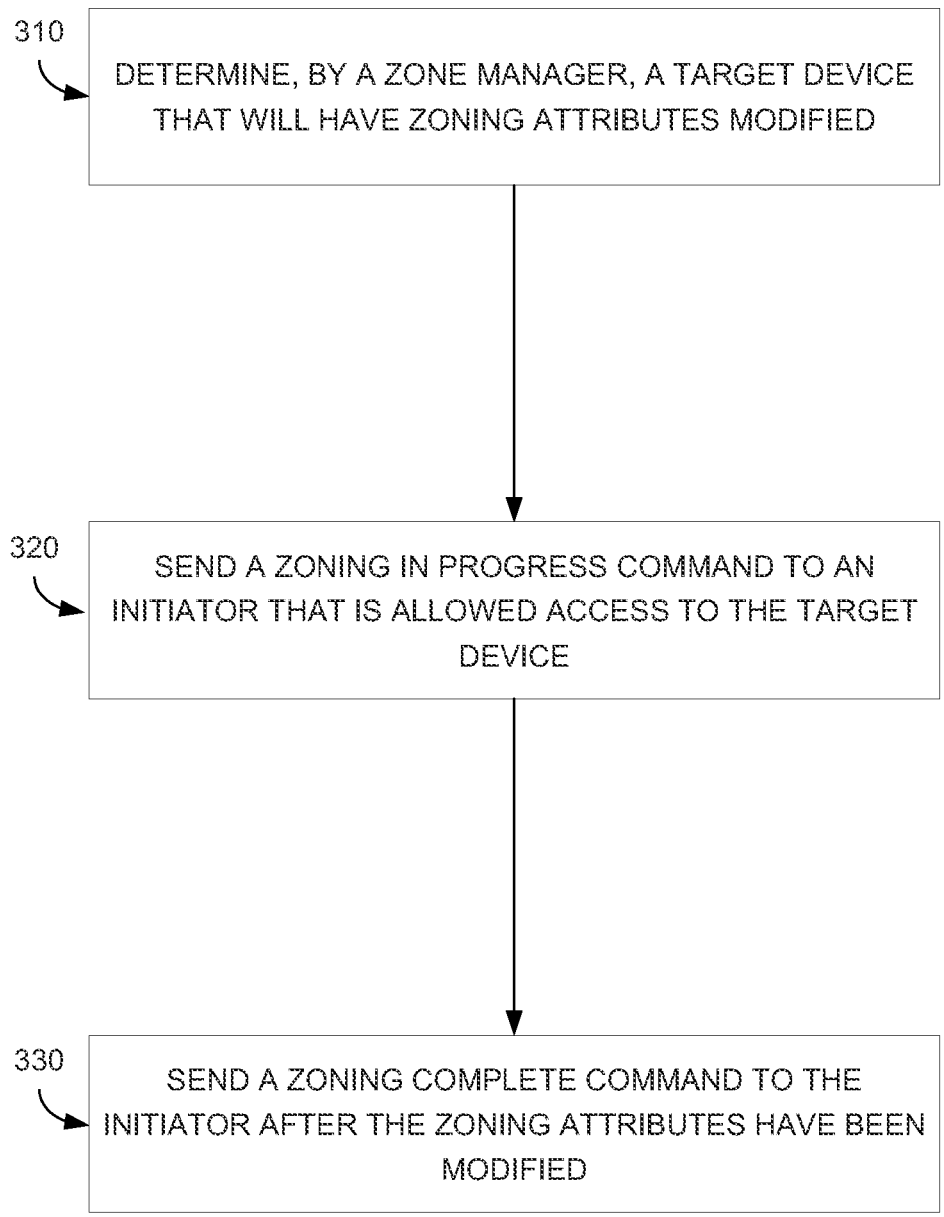
FIG. 3 is an example of a flow diagram for rezoning by a zone manager.

FIG. 3 is an example of a flow diagram for rezoning by a zone manager. The flow described in FIG. 3 may be implemented as a set of processor readable instructions. In block 310 a zone manager may determine a target device that will have zoning attributes modified. As described above a target device may belong to a zone and this zone is one of the attributes of the target device. Rezoning the target device involves modifying the zoning attribute of the target device.

Figure 4:
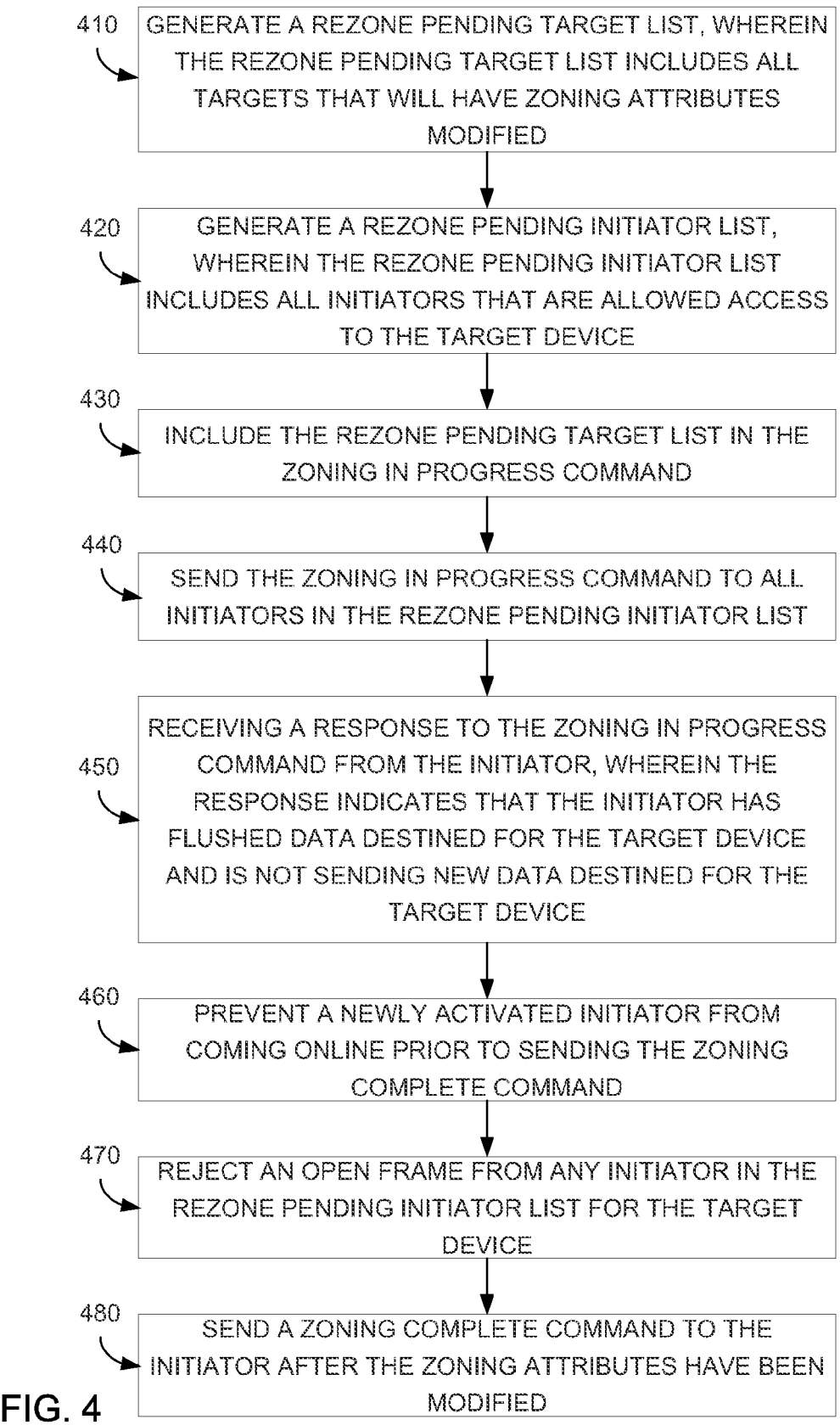
FIG. 4 is another example of a flow diagram for rezoning by a zone manager.

In block 320 a zoning in progress command may be sent to an initiator that is allowed access to the target device. In other words, an initiator that is currently in the same zone as the target device may be sent a command to inform the initiator that a rezoning operation involving the target device is about to occur. In block 330, a zoning complete command may be sent to the initiator after the zoning attributes have been modified, thus completing the zoning operation, FIG. 4 is another example of a flow diagram for rezoning by a zone manager. The flow described in FIG. 4 may be implemented as a set of processor readable instructions. In block 410 a rezone pending target list may be generated. The rezone pending target list may include all targets that will have zoning attributes modified. In other words, the list includes all targets that are being rezoned. In block 420, a rezone pending initiator list may be generated. The rezone pending initiator list may include all initiators that are allowed access to the target device. In other words, the rezone pending initiator list includes all initiators to which a access to a target device currently exists or will exist after completion of the zoning operation.

In block 430, the rezone pending target list may be included in the zoning in progress command. Inclusion of the target devices in the zoning in progress command allows recipients of the command to know which targets are having their zoning attributes modified. In block 440, the zoning in progress command may be sent to all initiators in the rezone pending initiator list. Thus all initiators that are affected by the rezoning operation are made aware of the specific targets that are being rezoned.

In block 450 a response to the zoning in progress command may be received from the initiator. The response may indicate that the initiator has flushed all data destined for the target device and is not sending new data destined for the target device. In block 460, a newly activated initiator may be prevented from coming online. As explained above, in the case of a newly booted initiator, the zoning in progress command may not have been received. By preventing a newly activated initiator from coming online, the newly activated initiator will not attempt to conduct discovery of the fabric topology while the topology is changing.

In block 470, an open frame from any initiator in the rezone pending initiator list for the target device may be rejected. Once the complete command is received, the initiator should no longer attempt to send data to the target. To provide some protection against a misbehaving initiator, once the complete command is received, attempts to access the target device using an open frame will be rejected. The initiator should have already flushed any data to the target device and should not have a need to access the target device. Rejecting new open frames ensures that the initiator does not attempt to access the target device while it is being rezoned. In block 480, a zoning complete command may be sent to the initiator after the zoning attributes have been modified. The initiator may then begin the process of fabric topology discovery without concern that the topology is in the process of changing.

Figure 5:
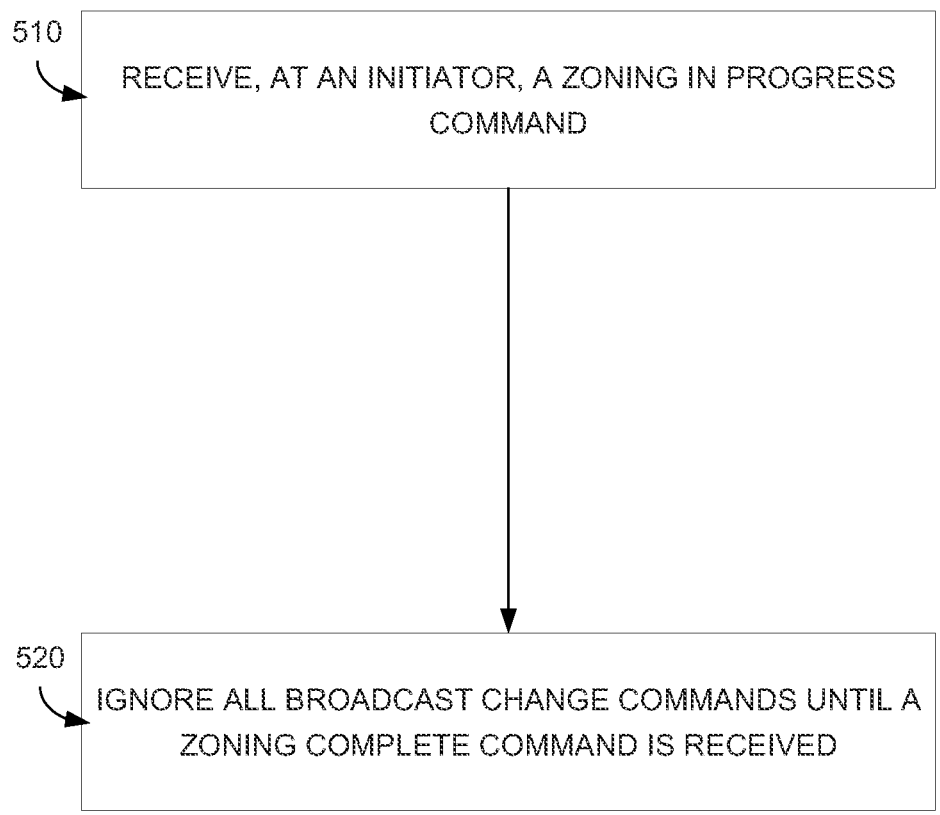
FIG. 5 is an example of a flow diagram of rezoning by an initiator.

FIG. 5 is an example of a flow diagram of rezoning by an initiator. The flow described in FIG. 5 may be implemented as a set of processor readable instructions. In block 510 a zoning in progress command may be received at an initiator. In block 520 all broadcast change commands may be ignored until such time that a zoning complete command is received. At that point, responding to broadcast change commands by conducting fabric topology discovery may resume.

Figure 6:
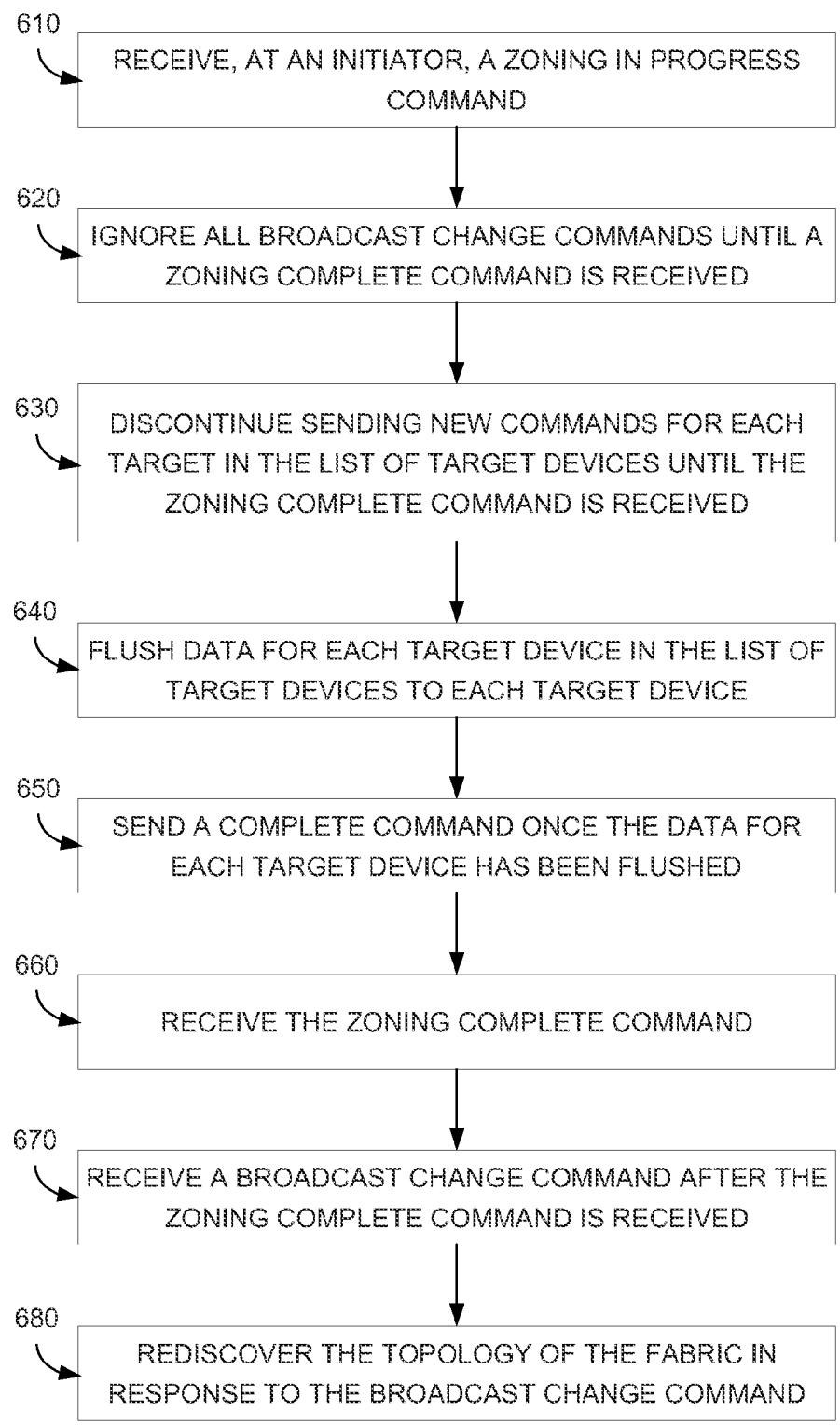
FIG. 6 is another example of a flow diagram of rezoning by an initiator.

FIG. 6 is another example of a flow diagram of rezoning by an initiator. The flow described in FIG. 6 may be implemented as a set of processor readable instructions. In block 610 a zoning in progress command may be received at an initiator. In block 620 all broadcast change commands may be ignored until such time that a zoning complete command is received. In block 630 sending new commands for each target in the list of target devices may be discontinued until the zoning complete command is received. As explained above, the zoning in progress command may include a list of all target devices affected by the zoning operation.

In block 640 data for each target device in the list of target devices may be flushed to the target device. As explained above, the initiator may no longer have access to a target device once the zoning operation is complete. Thus, any data stored by the initiator for a target device is flushed to the target device while access is still allowed. In block 650 a complete command may be sent once the data for each target device has been flushed. As mentioned above, the complete command notifies the zone manager that the rezoning process may continue. In block 660, the zoning complete command may be received.

In block 670 a broadcast change command may be received after the zoning complete command. In block 680 the topology of the fabric may be rediscovered in response to the broadcast change command.

Figure 7:
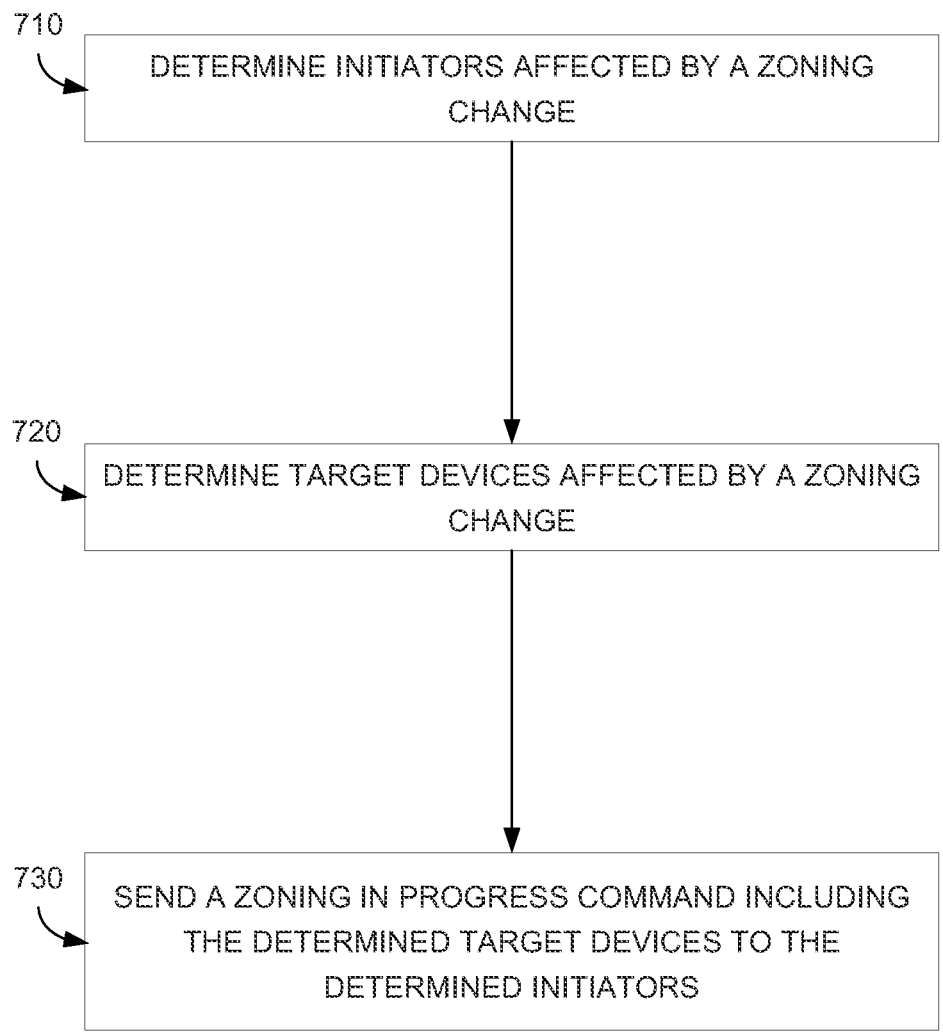
FIG. 7 is an example flow diagram of a rezoning operation.

FIG. 7 is an example flow diagram of a rezoning operation. The flow described in FIG. 7 may be implemented as a set of processor readable instructions. In block 710 the initiators affected by a zoning change may be determined. In block 720, the target devices affected by a zoning change may be determined. In block 730 a zoning in progress command including the determined target devices may be sent to the determined initiators. As described above, this allows the initiators that are affected by the zoning change to flush their data and to suspend discovering the new fabric topology until the zoning changes are complete.

Figure 8:
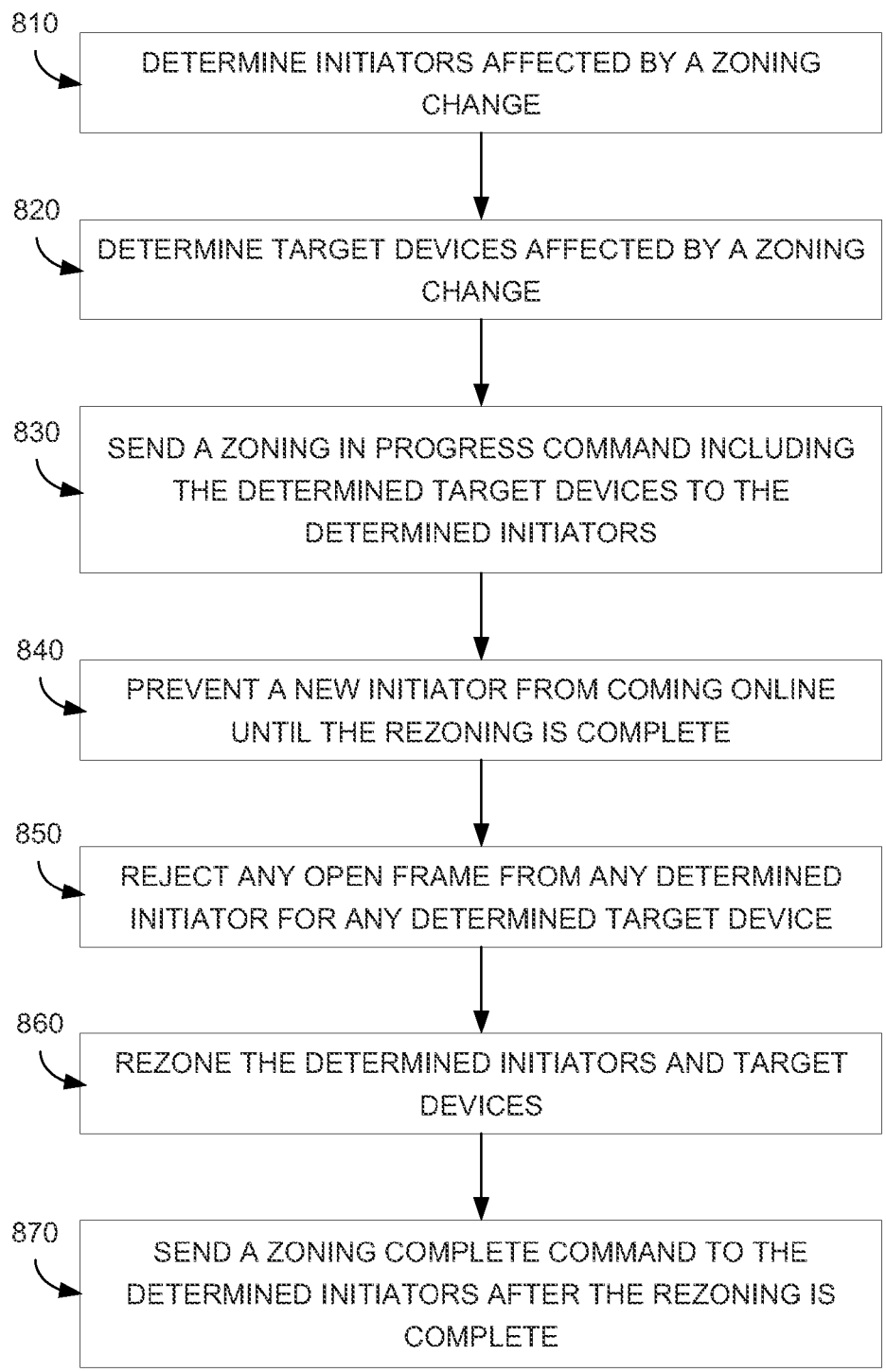
FIG. 8 is another example of a flow diagram of a rezoning operation.

FIG. 8 is another example of a flow diagram of a rezoning operation. flow described in FIG. 7 may be implemented as a set of processor readable instructions. In block 810 the initiators affected by a zoning change may be determined. In block 820, the target devices affected by a zoning change may be determined. In block 830 a zoning in progress command including the determined target devices may be sent to the determined initiators. In block 840, a new initiator is prevented from coming online until the rezoning is complete. As explained above, this prevents a new initiator from trying to discover the fabric topology while the topology is in the process of changing.

In block 850 any open frame from any determined initiator for any determined target is rejected. Although initiators should not be attempting to access the targets during a rezoning operation as described above, rejecting new open frames ensures that an initiator will not attempt to access the targets. Rejecting new open frames is a backup in case an initiator is behaving improperly.

In block 860 the determined initiators and target devices are rezoned. In block 870 a zoning complete command is sent to the determined initiators after the rezoning operation is complete. The initiators are then allowed to respond to BROADCAST CHANGE commands and rediscover the fabric topology as it exists after completion of the zoning operation.

We claim:

1. A method comprising:
    determining, by a zone manager, a target device that will have zoning attributes modified;
    sending a zoning in progress command to an initiator that is allowed access to the target device; and
    sending a zoning complete command to the initiator after the zoning attributes have been modified.

2. The method of claim 1 wherein sending the zoning in progress command further comprises:
    generating a rezone pending initiator list, wherein the rezone pending initiator list includes all initiators that are allowed access to the target device; and
    sending the zoning in progress command to all initiators in the rezone pending initiator list.

3. The method of claim 1 wherein determining the target device that will have zoning attributes modified further comprises:
    generating a rezone pending target list, wherein the rezone pending target list includes all targets that will have zoning attributes modified; and
    including the rezone pending target list in the zoning in progress command.

4. The method of claim 1 further comprising:
receiving a response to the zoning in progress command from the initiator, wherein the response indicates that the initiator has flushed data destined for the target device and is not sending new data destined for the target device.

5. The method of claim 1 further comprising:
preventing a newly activated initiator from coming online prior to sending the zoning complete command.

6. The method of claim 2 further comprising:
rejecting an open frame from any initiator in the rezone pending initiator list for the target device.

7. The method of claim 1 wherein sending the zoning in progress command further comprises:
preventing a rogue BROADCAST CHANGE message from causing an improper discovery of an SAS fabric topology.

8. The method of claim 1 wherein sending the zoning in progress command further comprises:
performing rezoning in an atomic manner such that discovery of an SAS fabric topology is inhibited until all zoning changes are made and affected expanders are made active.

9. The method of claim 8 wherein the discovery of the SAS fabric topology is not considered complete until all zoning changes are in place.

10. The method of claim 1 wherein initiators attempt to discover a new topology only upon completion of a zoning operation.

11. A method comprising:
receiving, at an initiator, a zoning in progress command; and
ignoring all broadcast change commands until a zoning complete command is received.

12. The method of claim 11 wherein the zoning in progress command includes a list of target devices, further comprising:
flushing data for each target device in the list of target devices to each target device.

13. The method of claim 12 further comprising:
sending a complete command once the data for each target device has been flushed.

14. The method of claim 12 further comprising:
discontinuing sending new commands for each target in the list of target devices until the zoning complete command is received.

15. The method of claim 11 further comprising:
receiving the zoning complete command;
receiving a broadcast change command after the zoning complete command is received; and
rediscovering the topology of the fabric in response to the broadcast change command.

16. The method of claim 11 further comprising preventing a rogue BROADCAST CHANGE message from causing an improper discovery of an SAS fabric topology by:
performing rezoning in an atomic manner such that discovery of an SAS fabric topology is inhibited until all zoning changes are made and affected expanders are made active;
wherein the discovery of the SAS fabric topology is not considered complete until all zoning changes are in place; and
wherein the initiator attempts to discover a new topology only upon completion of a zoning operation.

17. A non-transitory processor readable medium containing thereon a set of instructions which when executed by the processor cause the processor to:
determine initiators affected by a zoning change;
determine target devices affected by a zoning change; and
send a zoning in progress command including the determined target devices to the determined initiators.

18. The non-transitory processor readable medium of claim 17 further including instructions to cause the processor to:
rezone the determined initiators and target devices; and
send a zoning complete command to the determined initiators after the rezoning is complete.

19. The non-transitory processor readable medium of claim 17 further including instructions to cause the processor to:
prevent a new initiator from coming online until the rezoning is complete.

20. The non-transitory processor readable medium of claim 17 further including instructions to cause the processor to:
reject any open frame from any determined initiator for any determined target device.

* * * * *

UNITED STATES PATENT AND TRADEMARK OFFICE
CERTIFICATE OF CORRECTION

Page 1 of 1

PATENT NO. : 9,009,311 B2
APPLICATION NO. : 13/556994
DATED : April 14, 2015
INVENTOR(S) : Michael G. Myrah et al.

It is certified that error appears in the above-identified patent and that said Letters Patent is hereby corrected as shown below:

In the Drawings

In sheet 1 of 8, reference numeral 132, line 3, delete "READBLE" and insert -- READABLE --, therefor.

In Sheet 1 of 8, reference numeral 122-2, line 3, delete "READBLE" and insert -- READABLE --, therefor.

Signed and Sealed this
Twenty-ninth Day of September, 2015

Michelle K. Lee
*Director of the United States Patent and Trademark Office*